P. C. ROWE.
Tree-Protector.

No. 18,604.

Patented Nov. 10, 1857.

UNITED STATES PATENT OFFICE.

PHILIP C. ROWE, OF BOSTON, MASSACHUSETTS.

IMPROVEMENT IN MODES OF PROTECTING TREES FROM CANKER-WORMS, &c.

Specification forming part of Letters Patent No. 18,604, dated November 10, 1857.

*To all whom it may concern:*

Be it known that I, PHILIP C. ROWE, of Boston, in the county of Suffolk and State of Massachusetts, have invented an Improved Tree-Protector; and I do hereby declare that the same is fully described and represented in the following specification and the accompanying drawings, of which—

Figure 1:
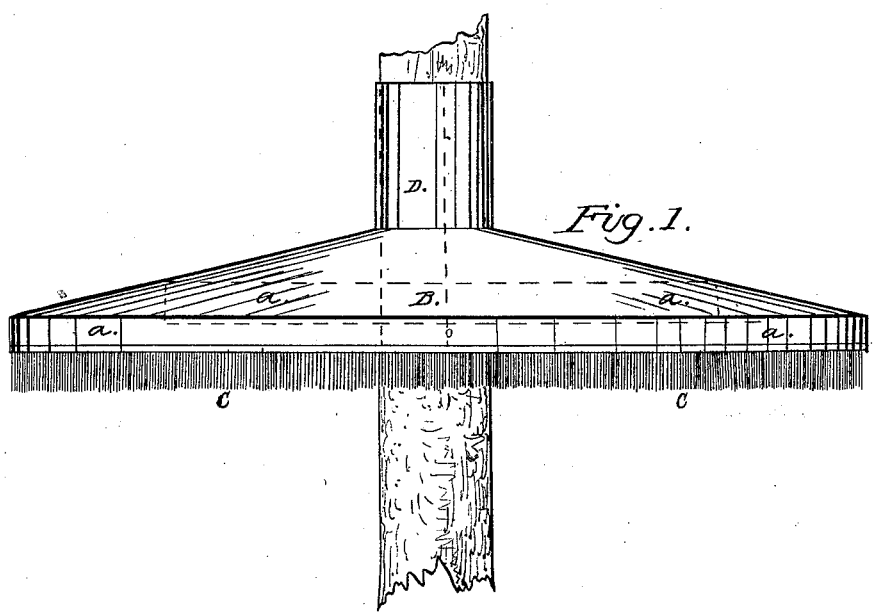
Figure 2:
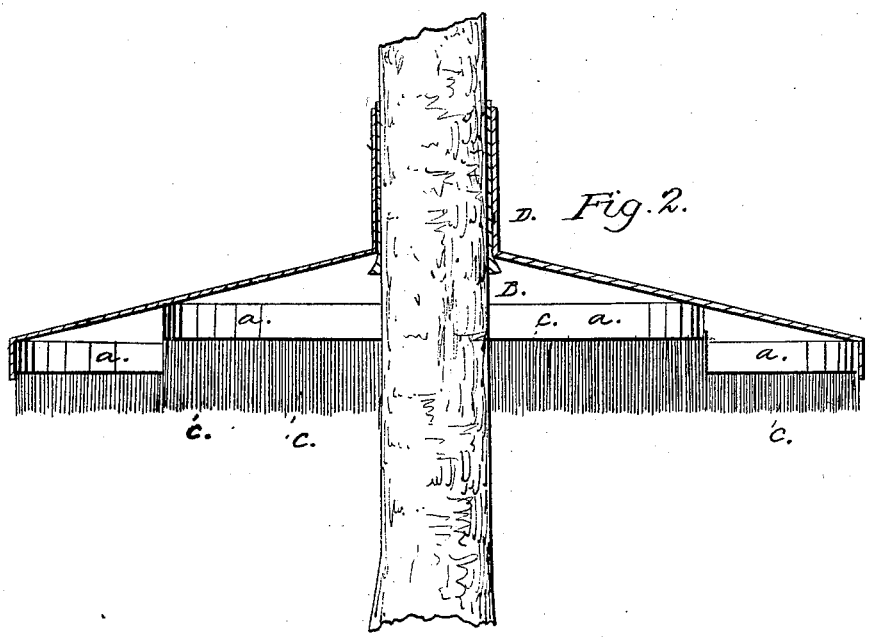

Figure 1 is a front elevation of my invention as applied to the trunk of a tree. Fig. 2 is a vertical section of the same.

The object of such contrivance is to prevent canker-worms, grubs, or insects from ascending trees; and for this purpose I extend around the trunk of a tree (see A, Figs. 1 and 2) an encircling sloping roof-plate or roof, B, composed of metal or other suitable material, and having one or more circular lips or flanges, $a$ $a$, extending down from its lower surface, as shown in Fig. 2. Where it goes around the tree such plate or roof has a collar, D, between which and the tree a stuffing of cotton or other suitable material may be introduced, in order to prevent the worms from passing between the collar and the trunk. Wedges may also be introduced in the space between the collar and tree, and so as to hold the roof-plate to the tree. From the lower edge or part of each or any one of the said lips $a$ $a$, I attach a fringe, $c$, made of silk or any other proper thread, and I extend the said fringe entirely around such edge and the tree, in order that the fringe may constitute an effectual barrier for or means of preventing a canker-worm from passing from one side to the other of the said fringe, or from the tree to the outer edge of the roof, and from thence up to that part of the trunk of the tree which may be above the roof.

While the roof-plate serves as a means of suspending the fringe around the tree, it also answers to protect the said fringe from dust, wind, and rain.

I have found by experiment that a light silken-thread fringe extended around the tree and supported in manner as described operates to excellent advantage as a protection to the tree against the ascent of worms, &c.

I am aware that for such purpose an encircling plate or roof has been applied around the trunk of a tree; also, that cotton-batting or loose fibrous material has been wound around and fixed to the body of a tree. Consequently I do not claim such means of preventing the ascent of canker-worms; but What I do claim is—

My improved tree-protector, made substantially as described—viz., with the encircling roof or cover of metal or other suitable material, and one or more circular or surrounding fringes suspended from the said roof and around the tree, substantially as described.

In testimony whereof I have hereunto set my signature this 12th day of October, A. D. 1857.

PHILIP C. ROWE.

Witnesses:
R. H. EDDY,
F. P. HALE, Jr.